United States Patent
Portigal et al.

(10) Patent No.: US 7,505,608 B2
(45) Date of Patent: Mar. 17, 2009

(54) METHODS AND APPARATUS FOR ADAPTIVE FOREGROUND BACKGROUND ANALYSIS

(75) Inventors: Fred Portigal, Albuquerque, NM (US); Dennis Yelton, Albuquerque, NM (US)

(73) Assignee: The Boeing Company, Chicago, IL (US)

( * ) Notice: Subject to any disclaimer, the term of this patent is extended or adjusted under 35 U.S.C. 154(b) by 524 days.

(21) Appl. No.: 11/107,155

(22) Filed: Apr. 15, 2005

(65) Prior Publication Data

US 2006/0233421 A1    Oct. 19, 2006

(51) Int. Cl.
*G06K 9/00*   (2006.01)

(52) U.S. Cl. ............... 382/103; 348/169; 356/303

(58) Field of Classification Search ........... 382/100, 382/103, 104, 105, 106, 107, 108, 162, 164, 382/165, 168, 170, 171, 173, 190, 191, 195, 382/203; 348/169, 170, 171, 172; 235/454; 356/303

See application file for complete search history.

(56) References Cited

U.S. PATENT DOCUMENTS

| | | | | |
|---|---|---|---|---|
| 5,602,760 | A * | 2/1997 | Chacon et al. | 382/103 |
| 6,038,344 | A * | 3/2000 | Palmadesso et al. | 382/191 |
| 6,075,891 | A * | 6/2000 | Burman | 382/191 |
| 6,079,665 | A * | 6/2000 | Nella et al. | 244/3.17 |
| 6,282,301 | B1 * | 8/2001 | Haskett | 382/103 |
| 6,487,516 | B1 | 11/2002 | Amorai-Moriya | |
| 6,504,943 | B1 | 1/2003 | Sweatt et al. | |
| 6,510,354 | B1 * | 1/2003 | Lin | 700/55 |
| 6,529,769 | B2 | 3/2003 | Zigler | |
| 6,539,122 | B1 | 3/2003 | Abousleman | |
| 6,640,132 | B1 | 10/2003 | Freeman et al. | |
| 6,665,438 | B1 * | 12/2003 | Lin | 382/191 |
| 6,813,380 | B1 | 11/2004 | Sola et al. | |
| 6,819,798 | B2 * | 11/2004 | Gorin | 382/207 |
| 6,831,688 | B2 | 12/2004 | Lareau et al. | |

\* cited by examiner

*Primary Examiner*—Bhavesh M Mehta
*Assistant Examiner*—Anand Bhatnagar (57) ABSTRACT

Apparatus and methods for target detection in hyperspectral images are disclosed. In one embodiment, a method of detecting a target in a hyperspectral image includes spectrally unmixing the hyperspectral image into segments, each segment having at least one of similar spectral composition, similar textural composition, and similar variation, and spectrally unmixing at least one of the segments. The method further includes creating a clutter rejection filter for at least one segment, filtering at least one segment, and calculating target abundances in at least one segment. In alternate embodiments, channel reduction can be performed on the hyperspectral image and also on at least one segment. In further embodiments, data associated with the location of possible targets in the segments may be compiled. In yet another embodiment, this data may be compressed by cross referencing data from all segments and eliminating redundancies.

20 Claims, 7 Drawing Sheets

METHODS AND APPARATUS FOR ADAPTIVE FOREGROUND BACKGROUND ANALYSIS

FIELD OF THE INVENTION

The present disclosure relates to methods and apparatus for detecting targets and/or anomalies within images having non-uniform backgrounds, and more specifically, to analytical models for improving target detection through local background and clutter rejection, even when the target is partially concealed.

BACKGROUND OF THE INVENTION

The detection of targets and/or anomalies in images having nonuniform backgrounds has numerous practical applications. For example, sensors may be employed in observational astronomy for the detection and tracking of stars, planets, and other extraterrestrial objects. In addition, target detection is also important in military applications, including, for example, the long range electro-optical detection, tracking, and discrimination of targets and decoys. Similarly, target detection may be used in the imaging and analysis of cells and particles for medical applications.

Although desirable results have been achieved using prior art target detection systems, there is room for improvement. For example, prior art detection techniques such as moving target detection and shape-based detection may be less than optimally-effective in detecting partially concealed targets. Other prior art hyperspectral (HS) detection techniques may be better suited for such an application, however, they are typically handicapped by algorithms which apply a scene-wide spectral-matched filter to a HS scene in order to detect targets. The matched filter can be optimized to look for the target while rejecting scene-wide background materials, but unfortunately, many HS scenes do not have uniform backgrounds, and are instead comprised of multiple regions having varying backgrounds. In such cases, prior art HS detection techniques may lead to sub-optimal performance since the single existing background rejection filter is constructed using generalized scene-wide information, which may be inappropriate for localized background areas in which a target may be located. Such application of a generalized filter to local areas within the image for which the filter is not suited may not only significantly decrease the probability of target detection, but might also increase the probability of registering false alarms as well. As a result, existing HS detection techniques can often be rendered inadequate for reconnaissance, surveillance, and tracking scenarios which require the detection of changes in imagery in real time, or with respect to previously acquired imagery. Therefore, there is a continuing impetus to increase the accuracy and precision of target detection techniques.

In addition, HS data volumes tend to be very large since they incorporate hundreds of spectral channels, requiring data compression for transmission and storage in many cases. For example, a single scene can contain over 200 MB of data, making uncompressed data transmission and storage very slow and cumbersome. Prior art principal component analysis techniques can be used to compress these data volumes, but the resulting representations can be low fidelity due to unaccounted-for spectral variation within a scene. As a result, existing HS detection techniques can often be rendered inadequate for reconnaissance, surveillance, and tracking scenarios, which require the transmission of HS imagery in real time. Therefore, there is a continuing impetus to decrease the data volumes associated with HS target detection techniques.

SUMMARY OF THE INVENTION

The present invention is directed to methods and apparatus for adaptive foreground background analysis, and more specifically, to target and/or anomaly detection in hyperspectral images by segmenting the image into regions of similar textural variation. Apparatus and methods in accordance with the present invention may advantageously improve the detection of potential targets in scenes of varying background while decreasing false alarms, and may further decrease the data volumes required to characterize, store, or transmit the original hyperspectral image.

In one embodiment, a method of detecting a target in a hyperspectral image includes spectrally unmixing the hyperspectral image, segmenting the hyperspectral image into segments, each segment having at least one of similar spectral composition, similar textural composition, and similar variation, and then independently unmixing each segment of interest. The method further includes creating a clutter rejection filter, filtering, and calculating target abundances in each segment of interest.

In alternate embodiments, channel reduction is performed on the hyperspectral image prior to the initial spectral unmixing in order to reduce the computational workload for this step. The same or entirely different channel reduction can also be performed each segment of interest to reduce the computational workload for its unmixing. In further embodiments, the data volume associated with the location of possible targets in the segments may be greatly reduced for storage or transmission. In one embodiment, this data comprises at least one of channel indices, target indices, target abundancies, endmember indices, and endmember abundancies. In yet another embodiment, the data volume may be compressed by cross-referencing data from all segments and eliminating redundancies, such as by referencing near identical endmembers between two segments to a single endmember spectrum.

BRIEF DESCRIPTION OF THE DRAWINGS

Preferred and alternative embodiments of the present invention are described in detail below with reference to the following drawings.

DETAILED DESCRIPTION OF THE INVENTION

The present disclosure relates to methods and apparatus for detecting targets and/or anomalies within images having non-uniform backgrounds, and more specifically, to analytical models for improving target detection through local background and clutter rejection. Many specific details of certain embodiments of the invention are set forth in the following description and in FIGS. 1-9 to provide a thorough understanding of such embodiments. One skilled in the art, however, will understand that the present invention may have additional embodiments, or that the present invention may be practiced without several of the details described in the following description.

As described more fully below, embodiments of methods and apparatus in accordance with the present invention may permit better target detection, even when the targets are partially concealed, via automatic background scene segmentation. Embodiments of the present invention may select only those channels from a hyperspectral (HS) image which contain essential information regarding the contrast between the background and target. The background of the image may then be analyzed and segmented into areas of similar textural variability. Constraints may be imposed to ensure that each segment is contiguous and that the number of pixels per segment is sufficient to provide statistically significant spectral information. Local clutter suppression filters may then be created for each segment based upon the individual background spectra of each segment. The smaller size of the segments relative to the overall image decreases the number of endmembers extracted from each segment, which in turn may increase the accuracy and quality of the local clutter suppression filters relative to a clutter suppression filter created for the entire image. As a result, use of the local suppression filters may not only significantly increase the probability of detection of a target, but may greatly reduce the probability of a false alarm as well. In alternate embodiments, the results from all segments may be correlated to eliminate redundancies, with near identical endmembers between segments being referenced to a single endmember spectrum. Data output for each region may include, for example, channel indices, target/anomaly indices, target/anomaly abundances, endmember indices, and endmember abundances, with the compressed file covering the entire segmented image typically having a data volume of 1-3% of that of the original hyperspectral image.

In the following discussion, the term "target" may variously be used to refer to any object of interest having a distinctive material composition or special signature, including objects of unknown composition but with spectral signatures that are anomalous relative to its surroundings. In addition, the terms "local region" and "segment" may variously be used to refer to areas of similar textural or spectral composition found within an image.

Figure 1:
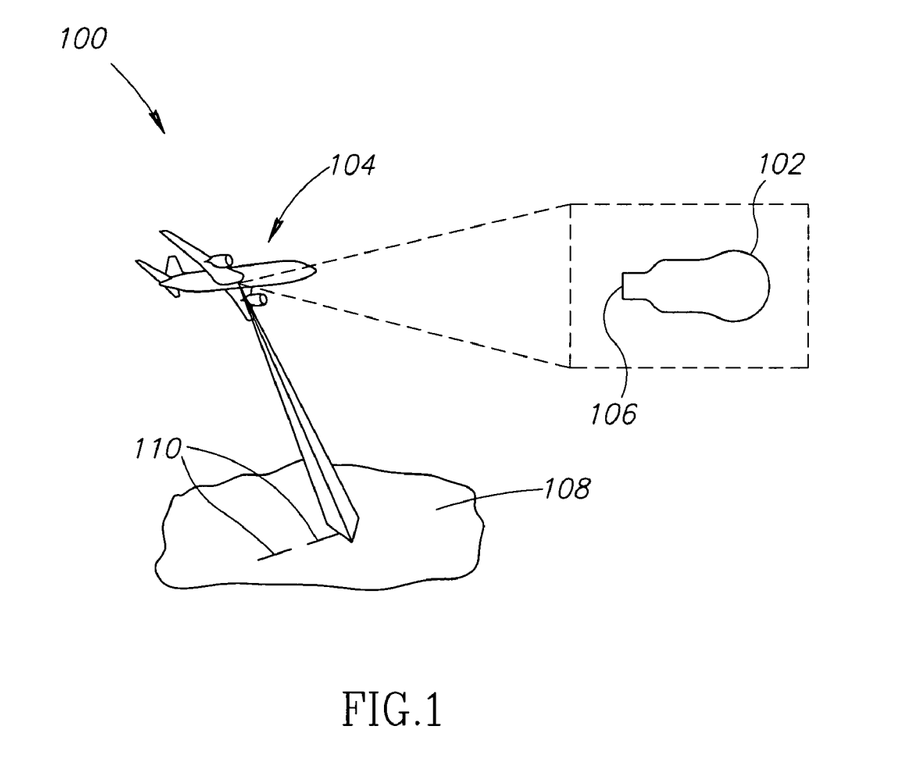
FIG. 1 is a schematic view of an imaging system in accordance with an embodiment of the present invention.

FIG. 1 is a schematic view of an imaging system 100 in accordance with an embodiment of the present invention. In this embodiment, the imaging system 100 includes a sensor 102 mounted on a carrier 104 passing an area of interest 108. The sensor 102 may comprise any type of apparatus known in the art for collecting information useful in creating hyperspectral (or multi-spectral) images, and typically remotely collects information from the area of interest 108 while the carrier 104 passes through several locations. The carrier 104 may comprise an aircraft, satellite or any other vehicle or device able to carry the sensor 102 through several positions remote from the area of interest 108. An aperture 106 of the sensor 102 may be directed toward the area of interest 108 and one or more potential targets 110 which may be present in the area of interest 108.

In a military application, for example, targets 110 may comprise military equipment, enemy installations, and troop concentrations and decoys. It will also be understood, however, that the present invention may be used for other applications as well, including observational astronomy where it might be desired to detect and track stars, planets, and other extraterrestrial objects. In such a case, the sensor 102 could be mounted on an orbiting spacecraft or fixed telescope (not shown in FIG. 1 for the sake of graphic clarity). Similarly, the sensor 102 could be mounted on various medical devices and used in the imaging and analysis of cells and particles for medical applications.

General principles of hyperspectral imaging are well known in the art, and relevant discussions of these technologies can be found in references such as, for example, U.S. Pat. No. 6,831,688 issued to Lareau et al., and U.S. Pat. No. 4,497,540 issued to Breckenridge et al., which are incorporated herein by reference.

In one embodiment of the invention, once enough hyperspectral data has been collected to suitably characterize an area of interest 108, the data can be processed by first subjecting it to Foreground Background Analysis (FBA) in which image wide spectral unmixing is undertaken, usually on channel-reduced imagery. FBA will be discussed below with reference to FIGS. 2-6

Figure 2:
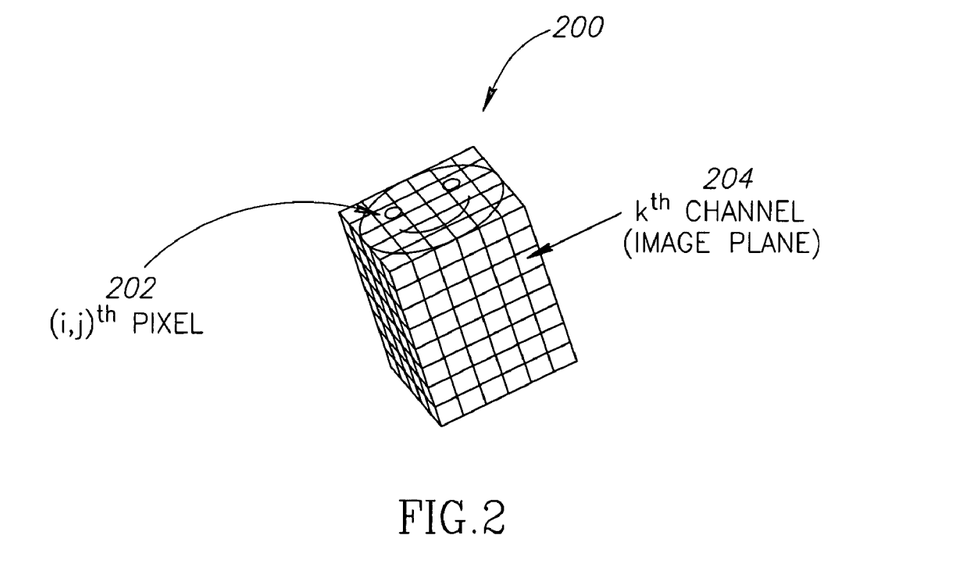
FIG. 2 is a perspective view of a hyperspectral image in accordance with an embodiment of the present invention.

FIG. 2 is a perspective view of a hyperspectral scene in accordance with one embodiment of the present invention. Raw hyperspectral scenes 200 comprises a plurality of image pixels 202, with each image pixel 202 comprising a spectrum of several, perhaps hundreds, of wavelength channels 204. The data for each wavelength channel 204 comprises a complete image for that wavelength, known as an image plane. Hyperspectral scenes 200 are typically associated with large data volumes, possibly exceeding 300 MegaBytes, but can often be characterized by only a handful of endmember spectra. Each of these endmember sprectra can, in turn, be characterized by only a few channels 204, but no fewer than the number of endmembers. One possible advantage of hyperspectral imagery is that it may provide quality resolution regardless of the combination of bands that best represents a particular scene 200.

The number of channels 204 in any given hyperspectral scene 200 often outnumber the number of channels 204 required to completely and accurately characterize the scene 200. This excess data may add overhead to unmixing the scene 200. In one embodiment, the excess data is eliminated before further processing is undertaken. Methods known in the prior art, such as Principal Component Analysis (PCA) or Minimum Noise Fraction (MNF) can be utilized for such an application, however, these methods may deleteriously reduce the data contained in the scene 200 based on its statistical characteristics. Since a target that only occurs in a few pixels 202 may be one of the statistically least significant features of a scene 200, its essential features (i.e. those distinguishing the target) could potentially be discarded using such prior art methods.

To overcome this obstacle, redundant data in a scene 200 can be removed, and endmembers from the scene 200 can be detected, based on an absolute significance rather than a statistical significance. By examining the absolute significance of the data in a scene 200, the probability of discarding even a single subpixel target is decreased and the speed at which the redundant data is discarded from the scene 200 is increased relative to the prior art methods mentioned above.

All but one in a set of highly correlated channels 204 can be eliminated without significantly loosing any information content from the scene 200. In one particular embodiment, the elimination of excess channels 204 from a scene 200 is facilitated using a modified Gram-Schmidt procedure wherein the data in a scene 200 is reduced based on absolute information content, as described more fully below. Since this process may be sensitive to spatial noise, a spatial noise filter may be applied to the data prior to using the algorithm. Using the filtered data, the channel 204 containing the peak signal across the scene is selected as the most significant channel. The modified Gram-Schmidt procedure then projects out this information from all the other channels, leaving the residual orthogonal to the most significant channel.

In the following discussion, column vectors are denoted by kets, such as $|x\rangle$. In this notation, row vectors are denoted by $\langle x|$, so $\langle x|$ is the transpose $|x\rangle$. It will be understood that $\langle x|$ is the conjugate transpose of $|x\rangle$, which is the same as the transpose for the real vector spaces under consideration. Thus, $\langle x|y\rangle$, a row vector matrix-multiplied by a column vector, is the inner product of $|x\rangle$ and $|y\rangle$, and is a scalar. Consequently, the cosine of the angle between $|x\rangle$ and $|y\rangle$ is $$\cos(\theta) = \frac{\langle x|y\rangle}{\sqrt{\langle x|x\rangle\langle y|y\rangle}}.$$

Similarly, $|x\rangle\langle y|$, a column vector matrix-multiplied by a row vector, is a rank 1 matrix.

Taking $|c_i\rangle$ as the vector corresponding to the data if the $i^{th}$ channel 204 out of a total of M channels 204, and assigning the most significant channel 204 to $|c_I\rangle$, the $j^{th}$ channel 204 residual orthogonal to the most significant channel 204, $|r_j\rangle$, this is calculated by $|r_k\rangle=|c_k\rangle, \forall k$ $|n_I\rangle=|r_I\rangle/\sqrt{\langle r_I|r_I\rangle}$ for j=1 to M $|r_j\rangle=|r_j\rangle-\langle n_I|r_j\rangle|n_I\rangle$ end.

Note that this correctly yields $|r_I\rangle=0$.

In a typical application of Gram-Schmidt, the channel 204 with the greatest residual norm across the entire scene 200, $|r_j\rangle \ni \langle r_j|r_j\rangle>\langle r_k|r_k\rangle \forall k\neq j$, would be selected as the second most significant channel 204. Such a procedure would likely discard channels 204 with subpixel target content since these targets contribute very little to the residual norm across the scene 200. In the procedure followed by an embodiment of the present invention, however, the channel 204 with the greatest absolute residual value across the scene 204, i.e., the $|r_j\rangle$ containing the element of largest magnitude, is instead selected as the second most significant channel 204, such that a subpixel target will not likely be missed. This information from the second most significant channel 204 is then projected out of the remaining channels 204, leaving the residual orthogonal to the two most significant channels 204. This process is repeated until the greatest absolute residual value across the scene 200 is below a predetermined threshold. The N most significant channels 204 are then used for endmember selection.

It may also be appreciated that, in addition to the channel reduction process described above, other suitable channel reduction techniques known in the art can also be used in conjunction with the present invention, including, for example, Gram-Schmidt procedures, band-moment analysis (Rundquist and Di, 1989, "Band-Moment Analysis of Imaging-Spectrometer Data," Photogrammetric Engineering & Remote Sensing, Vol. 55, No. 2, pp. 203-208), statistical channel seperability measures (Sheffield, 1985, "Selecting Band Combinations from Multispectral Data," Photogrammetric Engineering & Remote Sensing, Vol. 51, No. 12, AP6, pp. 681), and band averaging (Staenz and Goodenough, 1990, "Airborne Imaging Spectrometer Data Analysis Applied to an Agricultural Data Set," Global and Environmental Monitoring Techniques and Impacts, Proceedings: ISPRS Commission VII Mid-Term Symposium: September 1990, Victoria Canada, International Society for Photogrammetry and Remote Sensing, pp. 552-559), incorporated herein by reference.

Figure 3:
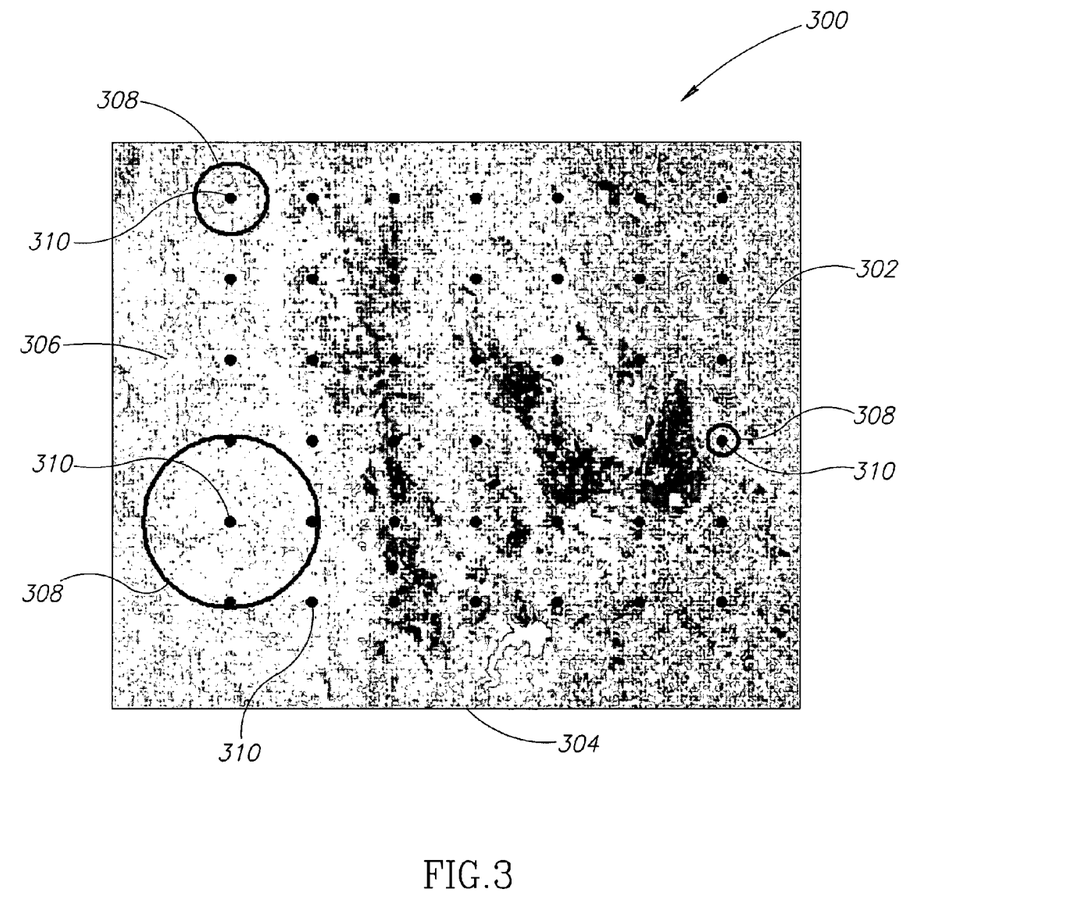
FIG. 3 shows a hyperperspectral image with a grid imposed thereon for use in creating a semi-variogram range map in accordance with an embodiment of the present invention.

In one embodiment of the present invention, once channel reduction has been completed, the hyperspectral image under consideration may then be subjected to image wide unmixing, and a spectral semivariogram range map may be created as an aid for separating regions of similar textural variability. FIG. 3 shows a hyperspectral image 300, which has been subjected to channel reduction. In this embodiment, the image 300 is a high altitude view of a landscape containing urban areas 302, areas of great topographical variation 304, and areas of low topographical variation 306. In order to create a semivariogram range map, a channel-reduced version of image 300 is first subjected to image wide unmixing. This entails spectrally decomposing the image 300 in order to find the few key material substances (i.e. endmembers) for the entire image 300, and their abundance in each pixel of the image 300. Endmembers characterizing image 300, for example, may include various types of soils and vegetation from the areas of great topographical variation 304 and the areas of low topographical variation 306, as well as manufactured materials (e.g. concrete and asphalt) from the urban areas 302. If the image 300 is comprised of N+1 endmembers, linear mixing with positive coefficients ideally guarantees that the spectral data from the image 300 will lie on or within an N-dimensional simplex (a polygon with N+1 vertices) with each vertex corresponding to an endmember.

Various well-known algorithms exist to perform spectral unmixing, including those described, for example, in "N-FINDR: an Algorithm for Fast Autonomous Spectral End-Member Determination in Hyperspectral Data," Winter, Michael E., SPIE Conference on Imaging Spectrometry V, Vol 3753, pp. 266-275, July 199, and, "Introduction to Hyperspectral Image Analysis", Shippert, Peg, found at http://sat-journal.tcom.ohiou.edu/pdf/shippert.pdf on Feb. 25, 2005, which texts are incorporated herein by reference.

The maximum contrast channel between background and target is segmented using a semi-variogram range map in which each pixel is assigned a value equal to the range at which there is no longer spatial correlation. This segments the image 300 into separate regions of similar texture. Still referring to FIG. 3, in one embodiment of the present invention, a semi-variogram range mapping algorithm is used in conjunction with image 300 to compute the maximum contrast channel semi-variogram ranges 308 centered on a selected grid of points 310 in the image 300. This grid can comprise a portion, or the entirety, of the pixels in image 300. The size of each semi-variogram range 308 indicates the spatial correlation between a pixel and its neighbors, since at each point 310, the border of the semi-variogram range 308 is expanded radially outward until it contacts an area of different texture. When such an area is encountered the semi-variogram range 308 has expanded to its maximum extent—one area of textural similarity ends, and another begins.

As shown in FIG. 3, the semi-variogram ranges 308 in the areas of low topographical variation 306 are much larger than the semi-variogram ranges 308 found in the urban areas 302. This reflects the higher spatial frequency content found in the urban areas 302, in contrast to lower regional complexity found in the areas of low urbanization 306. In FIG. 3, the semi-variogram ranges 308 are drawn as circles expanding from grid points 310. It will be understood, however, that any contiguous geometrical shape, such as, for example, triangles or quadrilaterals, may also be successfully employed in the creation of a semi-variogram range map. Moreover, in addition to the embodiments discussed above, various other well-known algorithms exist to create semi-variogram range maps, including those described in, for example, U.S. Pat. No. 6,721,694 to Lambrecht, et al., and U.S. Pat. No. 5,838,634 to Jones, et al., which are incorporated herein by reference.

Figure 4:
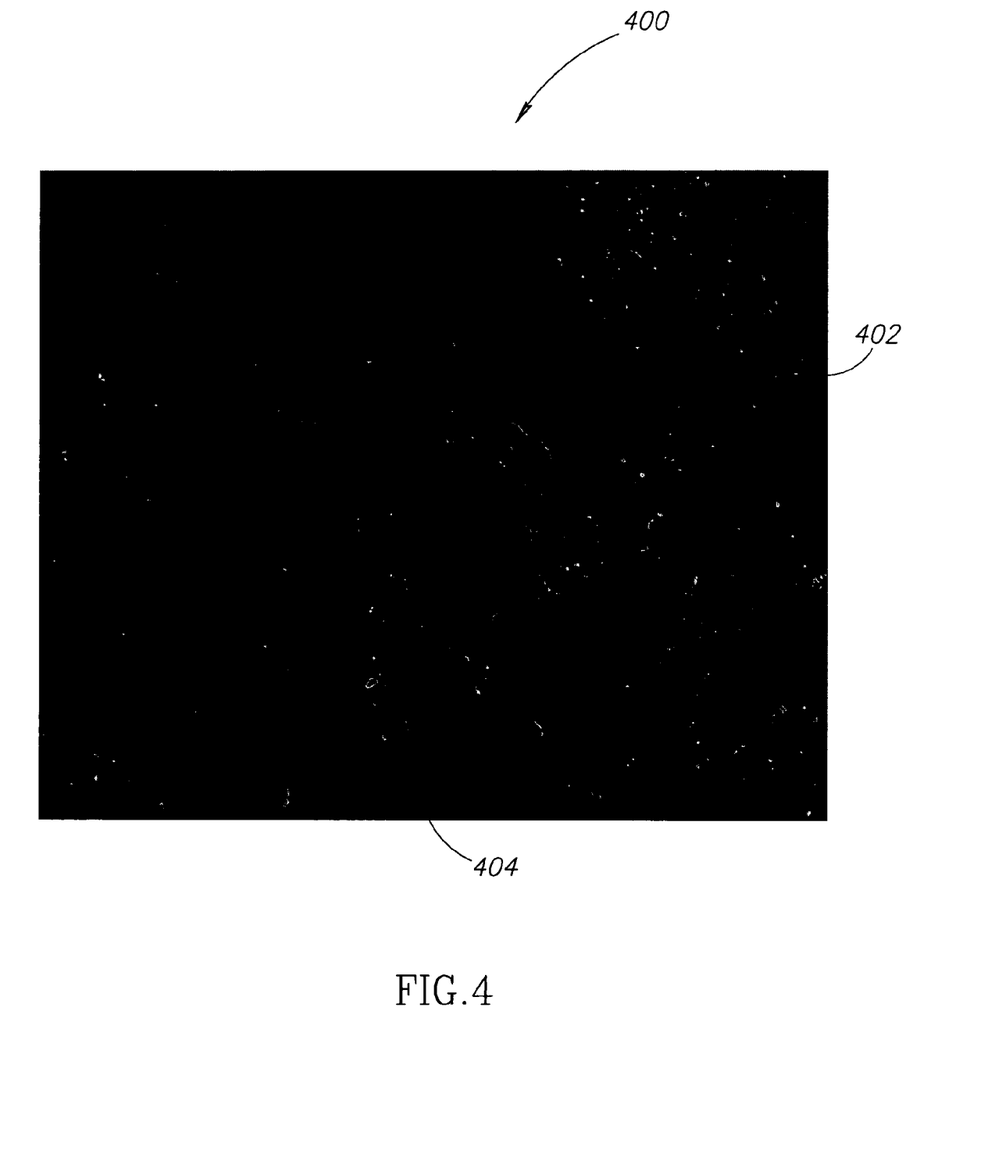
FIG. 4 shows a hyperspectral image after being subjected to channel reduction in accordance with another embodiment of the present invention.
Figure 5:
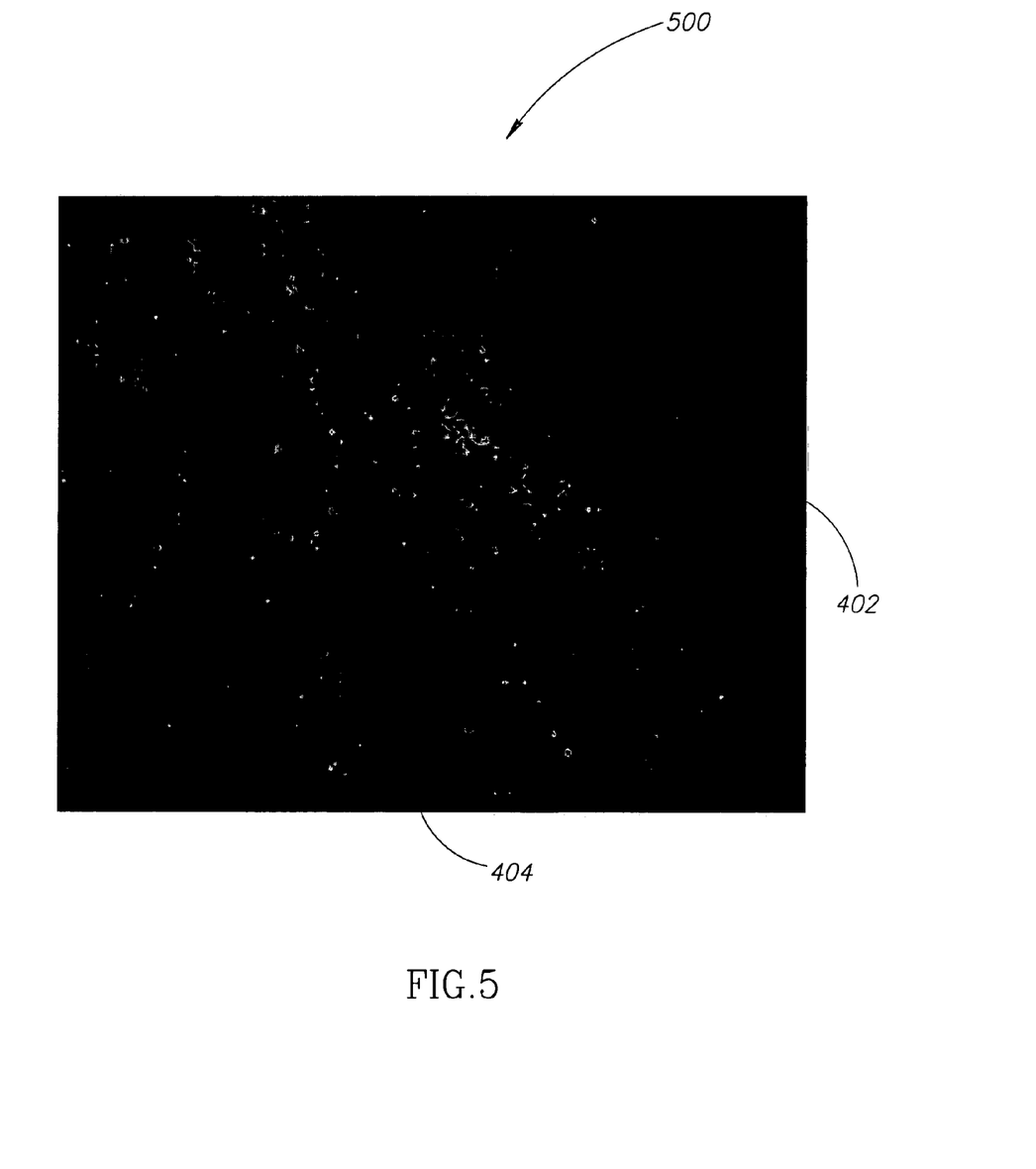
FIG. 5 shows a semivariogram representation of a hyperspectral image after having been spectrally unmixed in accordance with still another embodiment of the present invention.
Figure 6:
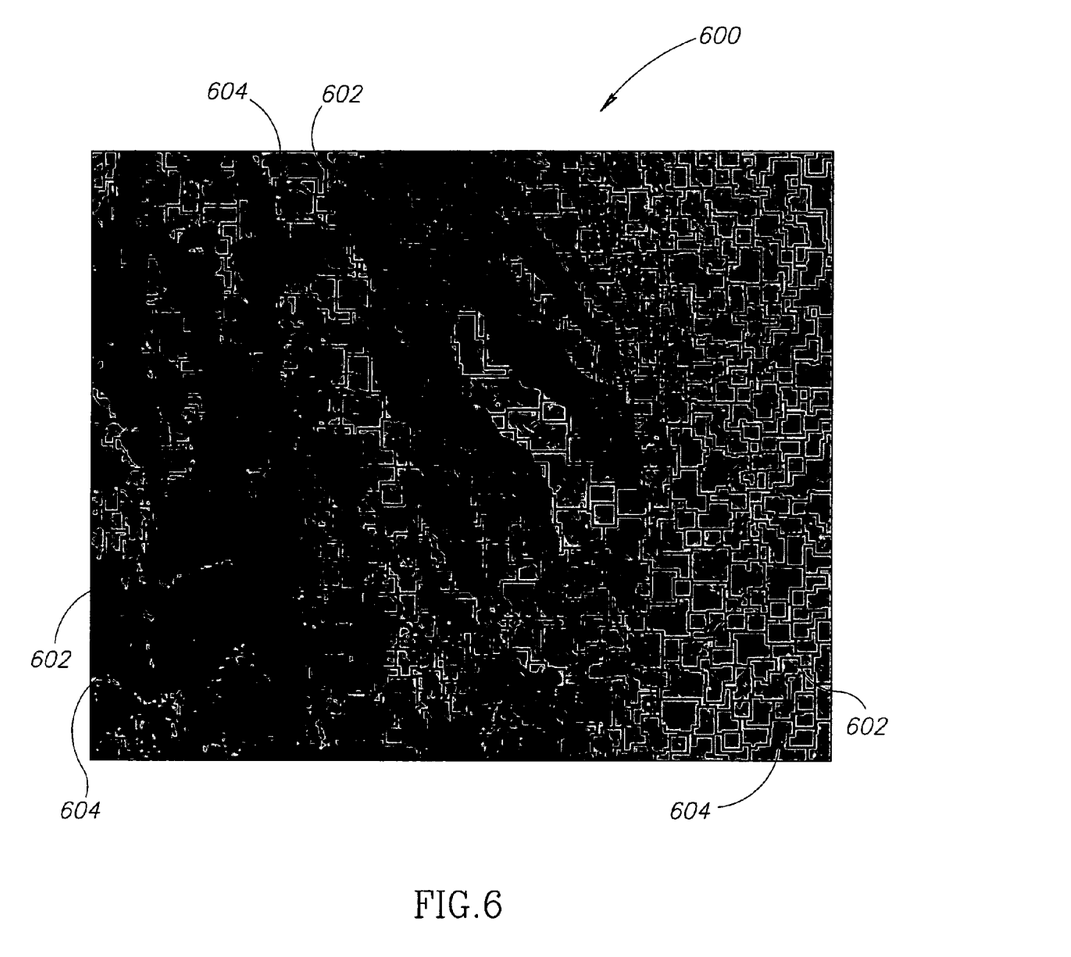
FIG. 6 is a hyperspectral image, which has been segmented into areas of similar textural variation in accordance with an embodiment of the invention.

FIGS. 4-6 illustrates a hyperspectral image being unmixed and then segmented into areas of similar textural characteristics. More specifically, FIG. 4 shows a hyperspectral image 400 which has been subjected to channel reduction. The image 400 is a high altitude view of a landscape containing urban areas 402 and areas of great topographical variation 404, which in this instance comprise mountains. When the image 400 is spectrally unmixed, a semivariogram image 500 as shown in FIG. 5 is created. The urban areas 402 and the areas of great topographical variation 404 are still present, though it is evident that they have been processed. Once a semi-variogram range map has been created, and the areas of textural similarity have been located, spatial segmentation of the range map breaks down the image 400 into discrete geographic regions where pixels are spatially-correlated. This is shown in FIG. 6, in which the final segmented image 600 is given.

As further shown in FIG. 6, borders 602 enclose regions (i.e. segments) 604 having similar textural characteristics. Constraints may be enforced to ensure that segments are contiguous, and that the data volume per segment is sufficient for statistically significant spectral unmixing within each individual segment. As might be expected, areas on the image 400 which show low levels of regional complexity, comprise larger segments 604 in FIG. 6. In contrast, areas of high regional complexity in FIG. 4, such as the urban areas 402, for example, comprise correspondingly smaller segments 604 in FIG. 6. Various well-known algorithms exist to accomplish spatial segmentation, including those described in, for example, U.S. Pat. No. 5,268,967 to Jang et al., U.S. Pat. No. 5,862,249 to Jang et al., and U.S. Pat. No. 6,678,398 to Wolters et al., which texts are incorporated herein by reference. Other techniques for spectral classification found in commercial-off-the-shelf (COTS) software could be used for segmentation prior to Adaptive Foreground Background Analysis (AFBA) described below.

Once a segmented image 600 has been created, another phase of the present invention known as Adaptive Foreground Background Analysis (AFBA), may be commenced. Under one embodiment of AFBA, each segment 604 is individually subjected to channel reduction using the various methods discussed above in conjunction with FBA. This is because each segment 604 usually comprises a large spectrum of wavelength channels, with the data for each wavelength channel comprising a complete image for that wavelength, known as an image plane. Each of the endmember sprectra within a segment can, in turn, be characterized by only few channels, but no fewer than the number of endmembers in that segment. Moreover, the number of channels in any given segment 604 almost always outnumbers the number of channels required to completely and accurately characterize the segment. The excess data may add overhead to unmixing the segment 604, so the excess data may advantageously be removed using channel reduction on a per-segment basis. In one particular embodiment, the optimum channels and endmembers are found using a variant of the Gruninger et al. algorithm (Gruninger, J. H., Sundberg, R. L., et al., 2001, "Automated optimal channel selection for spectral imaging sensors," Algorithms for Multispectral, Hyperspectral and Ultraspectral Imagery VII, SPIE Vol. 4381.)

Once all of the segments 604 in the segmented image 600 have undergone channel reduction, they may next be subjected to spectral unmixing. This may be conducted on a segment-by-segment basis using a variety of methods, including any of the spectral unmixing procedures discussed in detail above. As part of the AFBA procedure, background endmember, target and anomaly detection may occur within each individual segment 604, and the resulting endmembers may then be used to create customized clutter rejection filters for each segment 604. It may be desirable to ensure that the segments 604 are large enough to support any assumptions made by the unmixing algorithm utilized.

Figure 7:
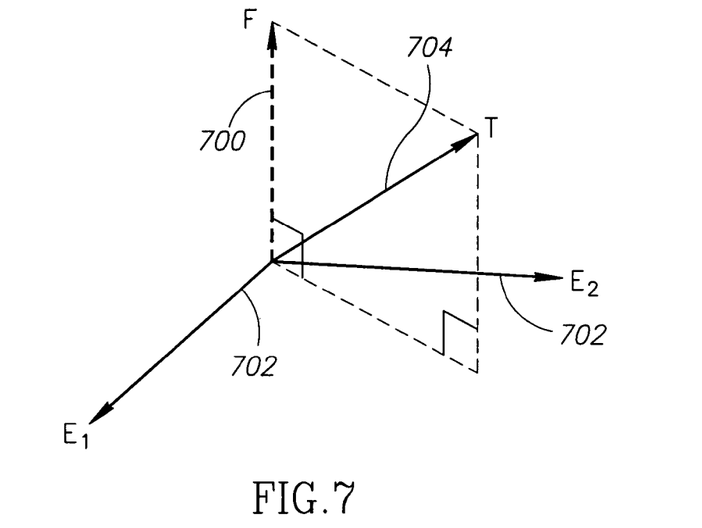
FIG. 7 is a schematic view of a clutter rejection filter in accordance with still another embodiment of the invention.

FIG. 7 shows a clutter rejection filter 700 constructed using background endmembers 702 determined for a segment 604 according to one embodiment of the present invention. In order to construct an optimal clutter rejection filter for a segment 604 which will null the contribution of the background endmembers 702 and leave a residual equal to the abundance (i.e. fill factor) for a specified target, the filter 700 is desirably oriented orthogonal to the endmembers 702, but not orthogonal to the target 704, else the target would be eliminated by the filter. The creation of a clutter suppression filter 700 such as shown in FIG. 7 can be quite complex when a large number of endmembers 702 must be used, such as when a clutter rejection filter 700 must be created for an entire hyperspectral image. In contrast, by segmenting the image into segments 604 of spectral similarity, a filter 700 can be created using a much smaller number of endmembers 702. This may increase the likelihood that a filter 700 can be created which is not nearly orthogonal to any targets in the segment 604, and which will enable proper identification of the targets. In alternate embodiments, any other suitable process for creating clutter rejection filters or target-matching filters may be used in conjunction with the current invention.

Figure 8:
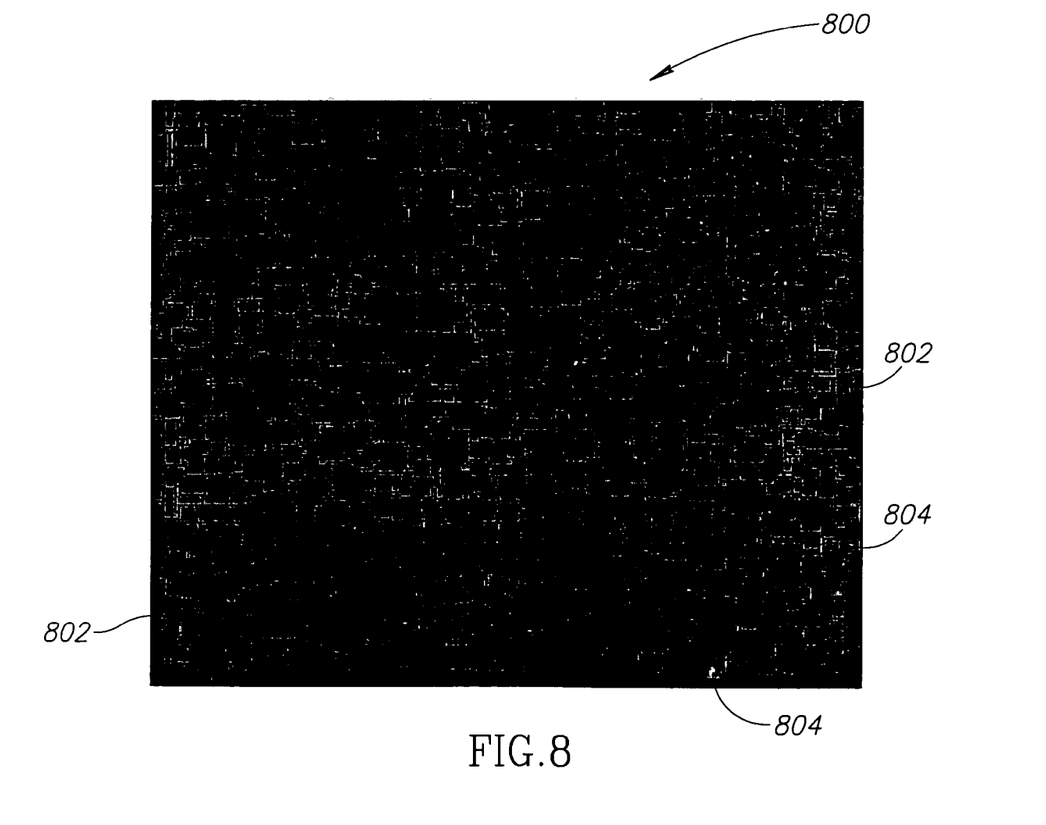
FIG. 8 is a target abundance image segmented into areas of similar textural variability in accordance with another embodiment of the invention.

FIG. 8 is a target abundance image 800 resulting from the creation and utilization of the clutter rejection filters created for each segment 802 in the image. In this embodiment, targets 804 show up as white spots against the dark backgrounds of each segment 802 and may only occupy a single pixel, or a few pixels. It will be understood that the filtered background of each segment could be white, or any other arbitrary color, and that targets 804 could also be chosen to be represented by any desired color. For the sake of operating ease, however, the colors chosen for targets 804 and backgrounds of segments 802 should contrast such as to be easily discernable from one another. In addition to visually examining the abundance image 800, other procedures, including, for example, computer algorithms, may be used to inspect the image 800 and detect the number, possible size, and placement of targets 804.

After enough data has been collected and processed to create a target abundance image 800, information concerning the existence and location of targets 804 may be sent via digital or analog means to end users of the information. This information, for example, may include channel indices, target indices, target abundancies, endmember indices, and endmember abundancies for each segment in a hyperspectral image. Moreover, this information may be compressed by cross referencing the results from all segments and eliminating spatial redundancies. For example, near identical endmembers between two segments could be referenced to a single endmember spectrum. In this fashion, it is possible to compress the data volume of a transmitted file to only 1-3% of that required to characterize the original hyperspectral image. This simplifies and accelerates the process of transferring the data volumes associated with the present invention between users and between data collectors and data processors.

Figure 9:
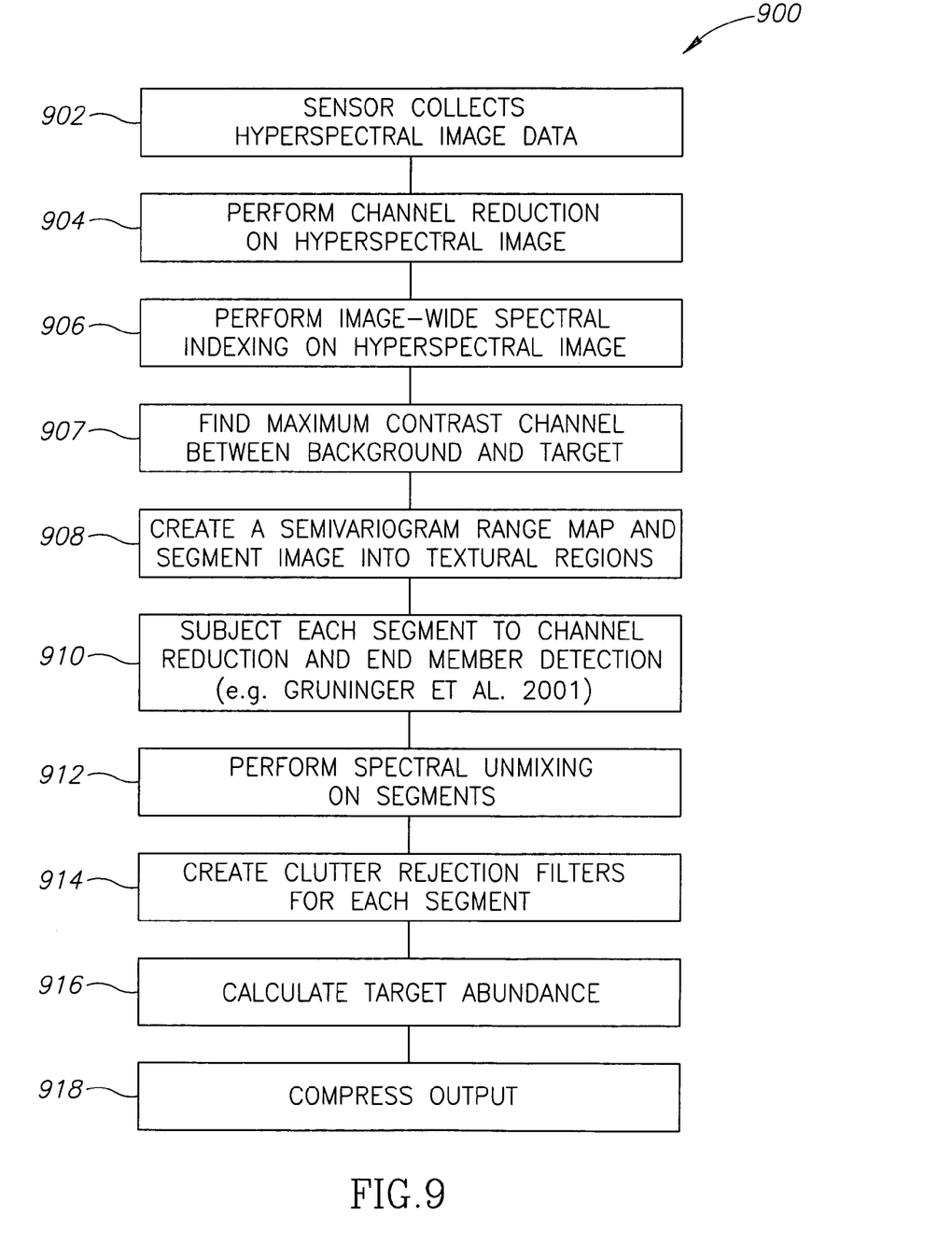
FIG. 9 is a flow chart of a method of processing a hyperspectral image in accordance with another embodiment of the present invention.

FIG. 9 is a flow chart showing a method 900 of detecting targets within images having nonuniform backgrounds in accordance with an embodiment of the present invention. The method 900 begins at a block 902 where hyperspectral image data is acquired by a sensor. At a block 904, the hyperspectral image data may be subjected to channel reduction wherein channels within the image which are highly correlated, and which contain redundant information, are removed. All but one in a set of highly correlated channels can be eliminated without significantly loosing any spatial information content from the hyperspectral image. As noted above, in one embodiment of the present invention, this elimination of excess channels from a hyperspectral image or scene may be facilitated using a modified Gram-Schmidt procedure (Gruninger, et al., 2001). It is also understood that any other procedure known in the art may be used to facilitate channel reduction in order to reduce the data size of a hyperspectral image based on absolute information content.

At a block 906, the reduced hyperspectral image may then be subjected to image-wide spectral unmixing, wherein the image is spectrally decomposed to isolate the few key material substances (i.e. endmembers) found in the image along with the abundance of each endmember in each pixel of the image. As noted above, if the image is comprised of N+1 endmembers, linear mixing with positive coefficients ideally guarantees that the spectral data from the image 300 will lie on or within an N-dimensional simplex (a polygon with N+1 vertices) with each vertex corresponding to an endmember. Spectral unmixing at block 906 can be accomplished using a variety of well-known algorithms including those previously mentioned above. The maximum contrast channel between background and target is found at a block 907.

At a block 908, a semi-variogram range map may be created using the maximum contrast channel and the image segmented into separate regions of similar spatial texture. In one embodiment, this is accomplished by assigning each pixel a value equal to the range at which textural differences from that pixel become significant. This can be accomplished by using a semi-variogram range mapping algorithm in conjunction with the image under consideration to compute the maximum contrast channel semi-variogram ranges centered on a selected grid of points. The grid points can comprise a subset, or every pixel, of the image. The size of each semi-variogram range indicates the spatial correlation between a pixel and its neighbors, since at each point, the border of the semi-variogram range is expanded outward until it contacts an area of different spectral characteristics. When such an area is encountered the semi-variogram range has expanded to its maximum extent, i.e., one area of textural similarity ends, and another begins. As discussed above, many suitable methods exist in the art which can be employed to create a semivariogram range map. Moreover, many suitable methods found in COTS software exist to segment a hyperspectral image into regions of similar spectral content. It is understood that these suitable methods for creating semivariogram range maps, and for segmenting hyperspectral images, may be used in conjunction with the present invention. It will also be understood, that the actions of creating a semivariogram range map and segmenting a hyperspectral image into regions of similar texture may be decomposed into separate method blocks without changing the spirit and function of the present invention.

At a block 910, the segmented image which has been created may be subjected to Adaptive Foreground Background Analysis (AFBA), and each segment may be individually subjected to channel reduction using a variety of methods, including those discussed above in conjunction with image-wide channel reduction. As previously discussed, each segment typically comprises a spectrum of wavelength channels with the data for each wavelength channel comprising a complete image for that wavelength, known as an image plane. Each of these endmember sprectra can, in turn, be characterized by only a few channels, but no fewer than the number of endmembers. Often, the number of channels in any given segment frequently outnumbers the number of channels required to completely and accurately characterize the segment. Thus, by removing channels which are not needed to accurately characterize the segment, the data volume of the overall image may be decreased, leading to decreased processing times for the processes that follow (Gruninger, et al, 2001).

With continued reference to FIG. 9, at a block 912, the segments in the image may be subjected to spectral unmixing. This may be conducted on a segment-by-segment basis using a variety of methods, including any of the spectral unmixing procedures discussed in detail above with background endmember, target and anomaly detection occuring within each individual segment. At a block 914, the endmembers resulting from the spectral unmixing performed in block 912 may be used to create customized clutter rejection filters for each segment. In order to construct an optimal clutter rejection filter for a segment, the filter may desirably be orthogonal to the background endmembers of the segment, but not orthogonal to a target which might be found in the segment.

At a block 916, target abundance may be calculated for the image. In one embodiment, the results can be interpreted visually by examining a target abundance image created by filtering the image with the filters created at block 912. Alternately, other procedures, including, for example, computer algorithms, may be used to inspect the image after it has been filtered and detect the number, possible size, and placement of targets within the image. Various methods exist in the prior art for processing filtered images in order to calculate target abundance, and it will be understood that these methods may be used in conjunction with the present invention.

At a block 918, after sufficient data has been collected and processed to locate the possible targets in a given image, information concerning the existence and location of the possible targets may be sent via digital or analog means to end users of the information. This information, for example, may include, channel indices, target indices, target abundancies, endmember indices, and endmember abundancies for each segment in a hyperspectral image. It will be understood that this information may be spatially compressed by cross referencing the results from all segments and eliminating redundancies. In this fashion, the process of transferring data volumes associated with the present invention between users and between data collectors and data processors can be simplified and accelerated.

Of course, a variety of alternate embodiments of methods in accordance with the present invention can be conceived, and the invention is not limited to the particular embodiments described above and shown in FIGS. 1-9. For example, it is possible to omit various blocks from FIG. 9. For instance, if desired, the entire image need not be subjected to channel reduction at block 904 before blocks 906-918 are performed. Moreover, once target abundance is calculated at block 916, the uncompressed data need not be compressed and sent to another location in order to be further processed or reviewed. Embodiments of methods and systems in accordance with the invention may advantageously improve target detection performance by allowing for target analysis to be conducted on regions of similar backgrounds. In this invention we segment using texture, however shape files or prior multispectral satellite drived classification maps could be used for segmentation. Furthermore, embodiments of the present invention may result in a compression of the data volume of a transmitted file to only 1-3% of that required to characterize the original hyperspectral image, thus simplifying and accelerating the process of transferring the data volumes associated with the present invention between users and between data collectors and data processors.

While preferred and alternate embodiments of the invention have been illustrated and described, as noted above, it will be appreciated that changes can be made without departing from the spirit and scope of the invention. Accordingly, the scope of the invention is not limited by the disclosure of the above-referenced embodiments. Instead, the invention should be determined by reference to the claims that follow.

What is claimed is:

1. A method of detecting a target or anomaly in a hyperspectral image, comprising:
    spectrally unmixing the hyperspectral image;
    segmenting the hyperspectral image into a plurality of segments, each segment having at least one of a similar spectral composition, a similar textural composition, and a similar variation;
    spectrally unmixing at least one of the segments;
    creating a clutter rejection filter for at least one of the unmixed segments;
    filtering at least one of the unmixed segments, wherein the clutter rejection filter is oriented orthogonal to background end members within the at least one unmixed segment while being not oriented orthogonal to the target or anomaly; and
    calculating a target abundance in at least one of the unmixed segment.

2. The method of claim 1, further comprising performing channel reduction on the hyperspectral image.

3. The method of claim 1, further comprising performing channel reduction on at least one segment.

4. The method of claim 1, wherein creating a clutter rejection filter for at least one segment comprises creating clutter rejection filters for a plurality of segments, and further comprising compiling data associated with the location of possible targets in the plurality of segments.

5. The method of claim 4, wherein the data compiled comprises at least one of a channel index, a target index, a target abundance, an end member index, and an endmember abundance.

6. The method of claim 4, further spatially compressing the compiled data by cross referencing data from all segments and eliminating redundancies.

7. The method of claim 6, wherein cross referencing data from all segments and eliminating redundancies comprises referencing near identical endmembers between two segments to a single endmember spectrum.

8. The method of claim 1, wherein segmenting the hyperspectral image into segments variation includes creating a semivariogram map of the image.

9. A computer readable storage medium having computer executable instructions for processing a hyperspectral image, comprising:
    a first computer program portion adapted to receive the hyperspectral image;
    a second computer program portion adapted to spectrally unmix the hyperspectral image;
    a third computer program portion adapted to segment the hyperspectral image into a plurality of segments, each segment having at least one of similar spectral composition, similar textural composition, and similar variation;
    a fourth computer program portion adapted to spectrally unmix at least one of the segments;
    a fifth computer program portion adapted to create a clutter rejection filter for at least one segment and to use the clutter rejection filter to filter that segment, wherein the clutter rejection filter is oriented orthogonal to background endmembers within the segment while being not oriented orthogonal to a target within the segment; and
    a sixth computer program portion adapted to calculate an abundance of targets in at least one segment.

10. The computer readable storage medium of claim 9, wherein the first computer program portion is adapted to perform channel reduction on the hyperspectral image.

11. The computer readable storage medium of claim 9, wherein the third computer program portion is adapted to perform channel reduction on at least one segment.

12. The computer readable storage medium of claim 9, wherein the fifth computer program portion is adapted to create a clutter rejection filter for a plurality of segments, and further wherein the fifth computer program portion is adapted to compile data associated with the location of possible targets in the plurality of segments.

13. The computer readable storage medium of claim 12, wherein the fifth computer program portion is adapted to compile data comprising at least one of a channel index, a target index, a target abundance, an endmember index, and an endmember abundance.

14. The computer readable storage medium of claim 12, wherein the fifth computer program portion is adapted to compress the data by cross referencing data from all segments and eliminating redundancies.

15. The computer readable storage medium of claim 9, wherein the third computer program portion is adapted to create a semivariogram map using the maximum contrast channel between target and background.

16. A sensor system for processing a scene, comprising:
    a sensor adapted to receive an hyperspectral image of the scene;
    a data reduction system operatively coupled to the sensor and including a processor and a memory device operatively coupled to the processor, wherein the data reduction system includes:
    a first portion adapted to receive the hyperspectral image of the scene from the sensor;
    a second portion adapted to spectrally unmix the hyperspectral image;
    a third portion adapted to segment the hyperspectral image into a plurality of segments, each segment having at least one of similar spectral composition, similar textural composition, and similar variation;
    a fourth portion adapted to spectrally unmix at least one of the segments;
    a fifth portion adapted to create a clutter rejection filter for the at least one segment and filter the at least one segment, wherein the clutter rejection filter is oriented orthogonal to background endmembers within the at least one segment while being not oriented orthogonal to a target within the at least one segment; and a sixth portion adapted to calculate an abundance of targets in the at least one segment.

17. The sensor system of claim 16, wherein the first portion is adapted to perform channel reduction on the hyperspectral image.

18. The sensor system of claim 16, wherein the third portion is adapted to perform channel reduction on at least one segment.

19. The sensor system of claim 16, wherein the fifth portion is adapted to create a clutter rejection filter for a plurality of segments, and further wherein the fifth portion is adapted to compile data associated with the location of possible targets in the plurality of segments.

20. The sensor system of claim 19, wherein the fifth portion is adapted to compile data comprising at least one of a channel index, a target index, a target abundance, an endmember index, and an endmember abundance, and further wherein the fifth portion is adapted to compress the data by cross referencing data from all segments and eliminating both spatial and spectral redundancies.

* * * * *